United States Patent
Iterum et al.

(10) Patent No.: US 7,055,147 B2
(45) Date of Patent: May 30, 2006

(54) SUPPORTING INTERACTIONS BETWEEN DIFFERENT VERSIONS OF SOFTWARE FOR ACCESSING REMOTE OBJECTS

(75) Inventors: Skef F. Iterum, San Francisco, CA (US); Ralph B. Campbell, San Jose, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 551 days.

(21) Appl. No.: 10/376,944

(22) Filed: Feb. 28, 2003

(65) Prior Publication Data

US 2004/0172462 A1 Sep. 2, 2004

(51) Int. Cl.
*G06F 9/44* (2006.01)

(52) U.S. Cl. .................. 717/170; 717/108; 717/116; 717/172; 707/203

(58) Field of Classification Search ............. 717/170, 717/169, 171–172, 108, 116, 160; 707/203; 719/316

See application file for complete search history.

(56) References Cited

U.S. PATENT DOCUMENTS

| | | | | |
|---|---|---|---|---|
| 5,499,365 A | * | 3/1996 | Anderson et al. | 707/203 |
| 5,535,389 A | * | 7/1996 | Elder et al. | 717/170 |
| 5,613,101 A | * | 3/1997 | Lillich | 709/230 |
| 5,805,899 A | * | 9/1998 | Evans et al. | 717/170 |
| 5,832,268 A | * | 11/1998 | Anderson et al. | 719/316 |
| 5,878,246 A | * | 3/1999 | Hildenbrand | 703/27 |
| 6,360,363 B1 | * | 3/2002 | Moser et al. | 717/170 |
| 6,453,324 B1 | * | 9/2002 | Baisley et al. | 707/203 |
| 6,519,767 B1 | * | 2/2003 | Carter et al. | 717/140 |
| 6,597,366 B1 | * | 7/2003 | Bennett et al. | 345/619 |

OTHER PUBLICATIONS

TITLE: An Efficient Version Model of Software Diagrams, author: Rho et al, IEEE, Dec. 1998.*
TITLE: Design and Implementation of Multi-Threaded Object request broker, author: Chang et al, IEEE, Dec., 1998.*
TITLE: Versioning Model of Image Objects for Easy Development of Image Database Applications, author: Kawashima et al, IEEE, 1996.*

* cited by examiner

*Primary Examiner*—Chameli C. Das
(74) *Attorney, Agent, or Firm*—Park, Vaughan & Fleming LLP (57) ABSTRACT

One embodiment of the present invention provides a system that facilitates interactions between different versions of software that support remote object invocations. During operation, the system receives a reference to an object that is implemented on a server. Next, the system identifies one or more versions of the object supported by the reference, wherein each successive version of the object inherits methods from a preceding version of the object. The system then invokes a method on the object that is supported by the one or more versions of the object.

30 Claims, 8 Drawing Sheets

FIG. 6B

SUPPORTING INTERACTIONS BETWEEN DIFFERENT VERSIONS OF SOFTWARE FOR ACCESSING REMOTE OBJECTS

BACKGROUND

1. Field of the Invention

The present invention relates to the task of upgrading software within a distributed computing system. More specifically, the present invention provides a method and an apparatus that supports interactions between different versions of software for performing remote object invocations. This makes it possible to perform rolling upgrades of software across nodes of the distributed computing system while the distributed computing system continues to operate.

2. Related Art

Some distributed operating systems presently allow clients to interact with objects located on remote servers. This makes it possible for a single client to access numerous objects implemented on servers scattered throughout a distributed computer system. For example, the Common Object Request Broker Architecture (CORBA) allows clients to transparently make both local and remote object invocations.

Figure 1:
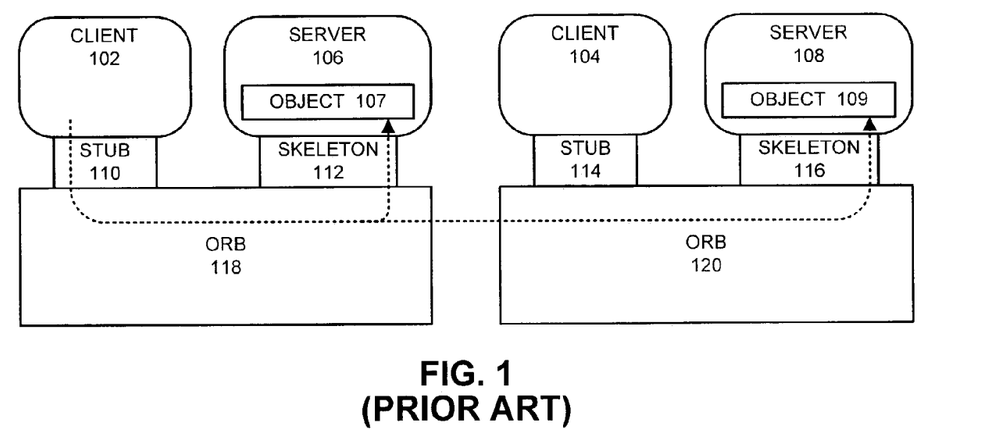
FIG. 1 illustrates a distributed computing system that supports remote object invocations.

CORBA provides a unique object reference for each object instance. A client can use this reference to direct an invocation to the associated object instance. Referring to FIG. 1, a client 102 invokes an operation on a stub 110, which acts as a proxy for an object instance 107. This invocation passes through stub 110 and then into Object Request Broker (ORB) 118. ORB 118 forwards the invocation to skeleton 112, which interacts with object instance 107 on server 106.

A remote object invocation works in almost the same way. Client 102 first obtains a reference to the remote object, for example by accessing a naming service. Client 102 then accesses the remote object in the same way that it accesses a local object. However, ORB 118 treats this remote object reference differently. When ORB 118 examines the reference and determines that the object is remote, ORB 118 routes the invocation to remote ORB 120, which is associated with remote object 109. Next, remote ORB 120 forwards the invocation into skeleton 116, which interacts with the remote object 109 on server 108.

Note that the CORBA standard defines an Interface Definition Language (IDL) framework that is supported by a corresponding IDL compiler. For each object type, a programmer typically defines an interface using the IDL. A client invoking an operation on the object uses a corresponding IDL interface to specify the operation it wants to perform and to marshal the arguments that it sends.

Although remote invocation mechanisms, such as CORBA, can greatly simplify the process of developing distributed applications, they can also complicate the process of updating software within distributed computing systems. Software within a distributed computing system is frequently updated to correct problems in the software or to add new features. However, it is not a simple matter to update software in a distributed computing system without halting the entire system for a significant period of time.

Note that it is possible to perform a "rolling upgrade" in a distributed computing system, wherein individual nodes in the distributed computing system are temporarily halted to load updated software without bringing the entire distributed computing system down. However, if some nodes are running the updated software and other nodes are not, there can be incompatibilities between different versions of the software that can cause the system to fail.

Hence, what is needed is a method and an apparatus that supports interactions between different versions of software for performing remote object invocations, thereby allowing a rolling upgrade of software to take place, without halting the entire distributed computing system and without generating incompatibilities between different versions of the software.

SUMMARY

One embodiment of the present invention provides a system that facilitates interactions between different versions of software that support remote object invocations. During operation, the system receives a reference to an object that is implemented on a server. Next, the system identifies one or more versions of the object supported by the reference, wherein each successive version of the object inherits methods from a preceding version of the object. The system then invokes a method on the object that is supported by the one or more versions of the object.

In a variation on this embodiment, identifying the versions of the object supported by the reference involves calling a version function that returns a highest version of the object supported by the reference.

In a variation on this embodiment, the system identifies the versions of the object supported by the reference by invoking a method on the object. If an unsupported version exception is returned by the method, the system concludes the version of the object supported by the reference is lower than the version of the object that implements the method.

In a variation on this embodiment, wherein the reference operates through an Interface Definition Language (IDL) framework that is supported by an IDL compiler, wherein the IDL compiler compiles interface definitions that specify methods associated with the object.

In a further variation, the system supports performing a narrow function on the reference, wherein the narrow function succeeds and returns a non-NULL pointer if version 0 of an interface being narrowed to is supported by the reference.

In a further variation, the IDL compiler supports annotating a method with a version number that identifies a version of an object that implements the method.

In a further variation, the IDL compiler supports annotating an object with a version number to facilitate specifying inheritance relationships between versions of objects.

In a further variation, the IDL compiler supports server only interfaces, wherein references cannot be narrowed to a server only interface, and wherein objects cannot specify their own methods. A server only interface can be used to create an intermediate object that inherits from two incompatible interfaces to facilitate upgrading to an incompatible major version of software.

In a variation on this embodiment, identifying the versions of the object supported by the reference involves examining an object type associated with the reference.

In a further variation, identifying the versions of the object supported by the reference involves looking up an entry for a deep type associated with the reference in a schema cache, wherein the entry for a deep type in the schema cache specifies versions of the object that are supported by the deep type.

In a further variation, the schema cache is a multi-level cache that includes: a client schema cache located at the client; a client-kernel schema cache located within the kernel of operating system hosting the client; and a server-kernel schema cache located within the kernel of an operating system hosting the server for the object. In this variation, the lookup is first performed in the client schema cache. If the lookup in the client schema cache fails, the lookup is performed in the client-kernel schema cache. If the lookup in the server-kernel schema cache fails, the lookup is performed in the server-kernel schema cache. Finally, if the lookup in the server-kernel schema cache fails, the lookup is performed by asking the server to specify which versions of the object are supported by the reference. (Note that some of the above steps will not be taken, or will be redundant, if the server and the client are located on the same node, or if the server and/or the client are located in the kernel.)

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Schema Cache

Figure 2:
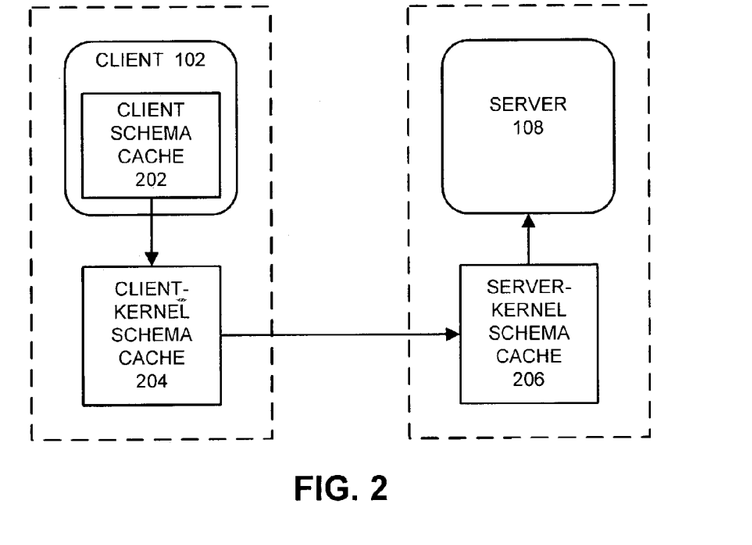
FIG. 2 illustrates a multi-level schema cache in accordance with an embodiment of the present invention.

FIG. 2 illustrates a multi-level schema cache in accordance with an embodiment of the present invention. A lookup is performed in this schema cache in order to perform an operation through an object reference. The system first obtains a "deep type" from an object reference, wherein the deep type is the most complicated type that the object can support. This deep type is used to lookup an entry in the scheme cache, which identifies one or more versions of the object supported by the deep type. Note that each successive version of an object inherits methods from preceding versions of the object. Also note that each type defines a specific tree of other, inherited types exactly. This is why a type can serve as the key to the cache lookup.

This schema cache includes several levels of caches, including a client schema cache 202 located on client 102. It also includes a client-kernel schema cache 204 located within the kernel of an operating system hosting the client. It additionally includes a server-kernel schema cache 206 located within the kernel of an operating system hosting a server for the object.

If the deep type for the reference cannot be located in client schema cache 202, the system looks up the deep type in client-kernel schema cache 204. If the deep type cannot be located in client-kernel schema cache 204, the system looks up the deep type in server-kernel schema cache 206. Finally, if the deep type cannot be located in server-kernel schema cache 206, the system queries the server 108 to determine which versions of the object are supported by the deep type. Note that in one embodiment of the present invention, server 108 is guaranteed to have the information, because it generated the reference containing the deep type in the first place. It is possible that server 108 has died before it could be contacted for the type of its server. However, no matter what the embodiment, a version exception is not generated here. The schema cache is contacted when a narrow (either implicit as part of passing a reference in an invocation, or explicit with a _narrow function call) is being performed, not when the reference is being used to invoke the server. It is not possible to return an exception from a narrow operation. In another embodiment of the present invention, the schema cache is centralized, and all servers register their wire schema there.

Note that once a deep type is successfully retrieved by client 102, copies of the deep type are stored in client schema cache 202, client-kernel schema cache 204 and server-kernel schema cache 206.

This speeds up subsequent lookups for the same deep type. Subsequent lookups from client 102 will find the deep type in client schema cache 202. Subsequent lookups from another client on the same machine as client 102 will find the deep type in client-kernel schema cache 204. Finally, subsequent lookups from clients on other machines will find the deep type in server-kernel schema cache 206.

Versions

Figure 3:
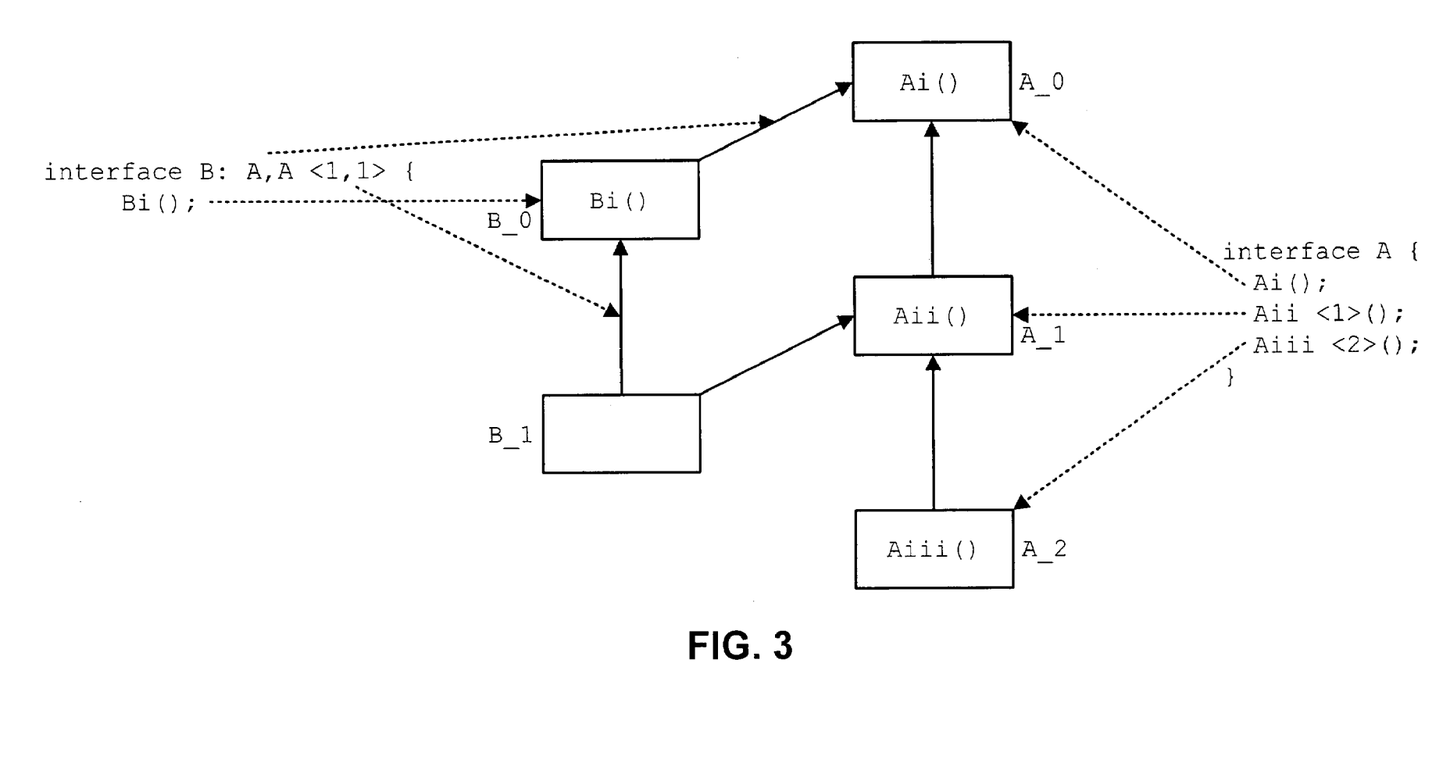
FIG. 3 illustrates inheritance relationships between different interface versions in accordance with an embodiment of the present invention.

FIG. 3 illustrates inheritance relationships between different interfaces versions in accordance with an embodiment of the present invention. Throughout this specification we use the terms "major version" and "minor version." A major version is one that differs from the previous version in an incompatible way, while a minor version is upwardly compatible from the version that came before it.

Minor IDL Versioning

To illustrate the minor versioning feature that is added to the IDL framework, we start with an exemplary set of interfaces:

```
interface A {
void Ai ( );
}
interface B : A {
void Bi ( );
}
```

The code listed above specifies an interface A with a method Ai, and an interface B that inherits the methods of A, and that also has a method Bi of its own. IDL versioning allows users to add additional interfaces at a later time, like this:

```
interface A {
void Ai ( );
void Aii <1> ( );
}
interface B : A {
void Bi ( );
}
```

In the above definition, we have added a method to interface A called Aii, but we have marked it at as being part of version 1 of A. The first version of A was implicitly zero. (Note that because the numbers placed in the IDL method or inheritance specifications refer to upwardly compatible changes in the interface definition, they should be seen as "minor numbers.") The definition of B has not changed, either implicitly or explicitly. It does not currently inherit method Aii from interface A, because it is only inheriting from A version 0. To make B inherit Aii from A, you need to add a new inheritance to B:

```
interface A {
void Ai ( );
void Aii <1> ( );
}
interface B : A, A <1:1> {
void Bi ( );
}
```

Now B version 0 inherits from A version 0, and B version 1 inherits from A version 1, and therefore inherits method Aii. In the notation <1:1>, the first 1 refers to the version of the object that is inheriting, or B, and the second 1 refers to the version of the object being inherited, or A. Note that the definitions of A version 0 and B version 0 have not changed, because everything we have added has had a version number associated with it. The IDL compiler generates "typeids" for each version of each interface. If we had accidentally changed B version 0, perhaps like this,

```
interface B : A {
void Bi ( );
void Bii ( );
}
``` the IDL compiler would generate a typeid for B version 0 that indicates it contains both methods Bi and Bii. However, this typeid is different than the one generated for B that lacks Bii, so the error will get caught when checking our master list of names and typeids.

Note that every interface has a name, a definition, and a typeid. The definition of an interface is the combination of its name, every method it defines, and the names of the interfaces it inherits from (but not the definitions of those methods). In our scheme, a name is really a name combined with a version number, because at this level each individual version is treated as a separate type which has a close association with other types of the same name but different version numbers. A typeid is a unique numeric abbreviation of a definition. It is generally made by creating a specific alphanumeric encoding (in ASCII, for instance) of the elements of the definition in a certain order, and then using a cryptographic checksum of that definition as the typeid. An example of a cryptographic checksum would be the md5 algorithm.

Moreover, note that every interface, including server only interfaces, is completely defined by its name, the types it inherits, and the methods it implements. Furthermore, once a new version of an interface is established, it never changes and there is a one-to-one correspondence between a specific version of an interface and a typeid. Therefore, the question of whether a given object supports some version of an interface can be reduced to whether the typeid associated with the version is in the hierarchy of typeids associated with the deep type of the object.

The best way to think of this notation is shorthand for what you could do with simple inheritance. Our example:

```
interface A {
void Ai ( );
void Aii <1> ( );
}
interface B : A, A <1:1> {
void Bi ( );
}
``` could be thought of as encoding this relationship:

```
interface A_0 {
void Ai ( );
}
interface A_1 : A_0 {
void Aii ( );
}
interface B_0 : A_0 {
void Bi ( );
}
interface B_1 : B_0, A_1 {
}
```

When a reference to that server object is passed to another node, there are at least two ways of discovering which versions the server behind that reference supports. One way is to use the _version function, which is a function generated by the IDL compiler for each interface, similar to the CORBA _narrow function:

int v=B::_version(my_ref);

The _version function returns the highest version of the specified interface supported by the reference, or −1 if no version is supported. In this case, v is set to 1. If the reference is passed from a node using the first IDL specification at the top of this description, v is set to 0.

A second way versions can be detected is through an unsupported version exception. This exception is returned when an invocation is made on a method that is not part of any of the versions the server supports. For instance, if a client compiled with knowledge of version 1 of B (and hence with knowledge of method Aii) gets a reference to a server that only supports version 0 of B (and hence does not know about method Aii), any invocation of method Ai or Bi will succeed (barring other failures), but an invocation of method Aii will immediately return the unsupported version exception.

Method Invocations

Figure 4A:
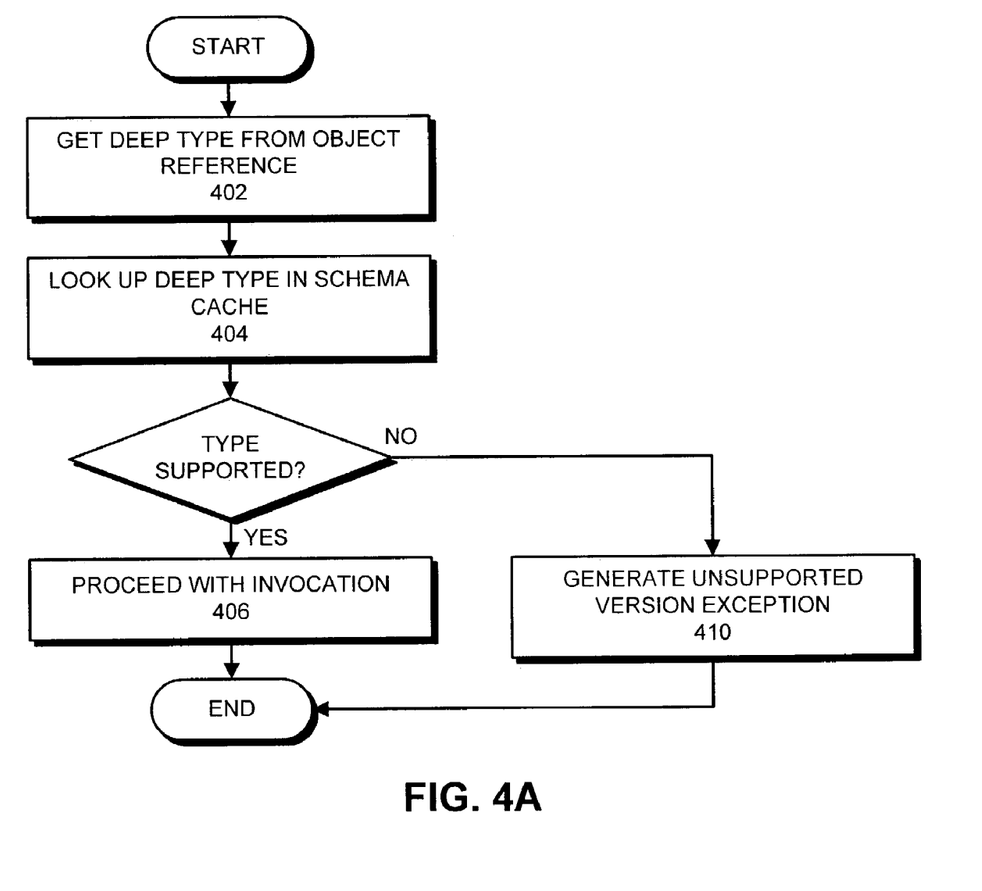
FIG. 4A presents a flow chart illustrating how a method is invoked on a remote object in accordance with an embodiment of the present invention.

FIG. 4A presents a flow chart illustrating how a method is invoked on a remote object in accordance with an embodiment of the present invention. The system starts with an object reference for the object. Next, the system gets the deep type from the object reference (step 402) and looks up the deep type in the schema cache (step 404). If the deep type is successfully retrieved from the schema cache, the deep type is supported. In this case the system proceeds with the method invocation (step 406). Otherwise, the system generates an unsupported version exception (step 408).

Figure 4B:
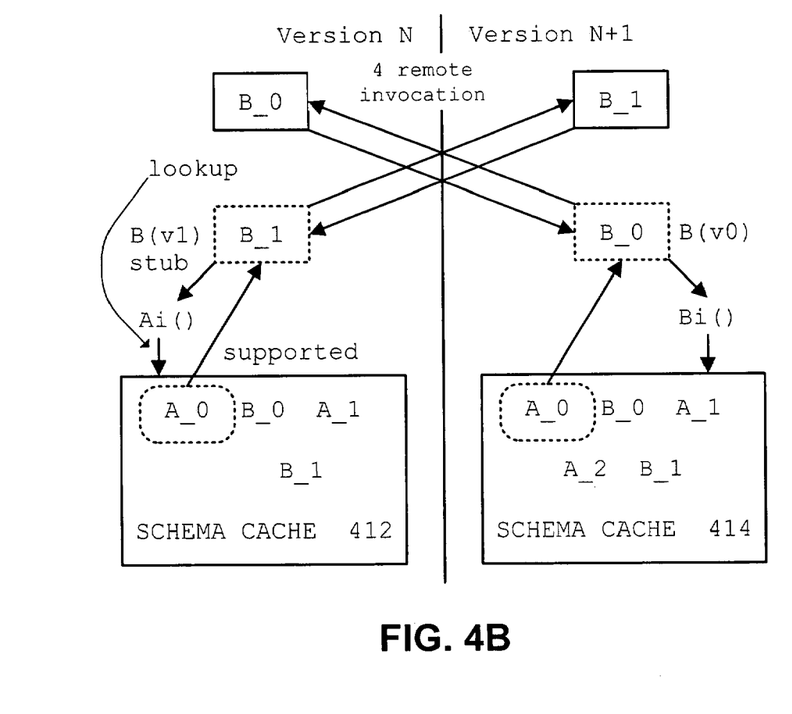
FIG. 4B illustrates successful method invocations between different software versions in accordance with an embodiment of the present invention.

FIG. 4B illustrates successful method invocations between different software versions in accordance with an embodiment of the present invention. In FIG. 4B, an invocation to method Ai( ) through an interface for version B_1 is successful because method Ai( ) is supported by the deep type associated the reference. This involves referencing method Ai( ) through a stub, and then looking up the deep type for the object in the schema cache 412 (step 404). If the method is supported, the system proceeds with the invocation (step 406). Similarly, an invocation to method Bi( ) is successful through an interface for version B_0 is successful because Bi( ) is supported by the deep type associated with the reference.

Figure 4C:
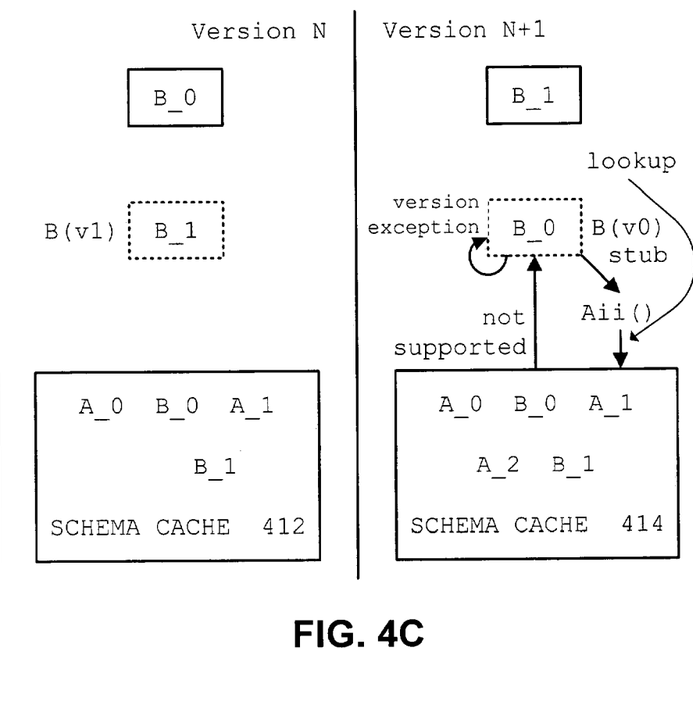
FIG. 4C illustrates an unsupported version exception arising during a method invocation in accordance with an embodiment of the present invention.

FIG. 4C illustrates an unsupported version exception arising during a method invocation in accordance with an embodiment of the present invention. In this case, an invocation to method Aii( ) is first made through a stub. Next, the system looks up the deep type for the object in schema cache 414 (step 404). In this case, method Aii( ) is not supported through an interface for version B_0. Hence, an unsupported version exception is generated (step 408).

Narrow Function

Note that the embodiment of the present invention described above changes in the semantics of the standard _narrow function. If the versioning notation in the IDL compiler was only a shorthand for object inheritance with no additional support, a client could not narrow an object reference with a deep type of B version 0 to a proxy implementing Bi version 1, because version 0 does not contain version 1. The new semantic for _narrow is that as long as version 0 of the interface being narrowed to is supported, the narrow succeeds and returns a non-null pointer. This pointer is to a local implementation (a proxy, in ORB terminology) that supports whatever version of the interface was highest in the IDL file, and the proxy will return the unsupported version exception when unsupported methods are invoked. This change in semantics makes the use of versioning much more transparent, and allows any client code invoking the methods on the original version 0 interface to continue to work without modification.

With these semantics, a server compiled to support a higher version of an interface can be used transparently by a client compiled without knowledge of that version, because the _narrow function will succeed and every method the client expects to find will be implemented on the server. New clients can use older server objects, but may have to detect the version supported with the _version function, or tolerate receiving unsupported version exceptions for methods on newer, unsupported versions of the interface. The idea behind this design is that when a server supports a method and the client tries to call it, versioning never needs to enter the picture. When there is a mismatch, a clean predictable exception is delivered.

Note that the _version function returns the lower of: (1) the highest version of an interface supported by the server, or (2) the highest version of an interface known by the client. The main reason for this is we're concerned about code like the following:

```
if (A::_version(myref) == 1) {
    myref->foo( ); /* new way */
} else {
    myref->bar( ); /* old way */
}
```

This code works fine when compiled and tested when foo is added to A in version 1. However, if _version returns the "correct" value, it starts doing the wrong thing when A goes to version 2, and by that time the code is already deployed (the correct comparison would have been "A::_version (myref)>=1"). If we use the "lower of" rule, the likelihood of these problems decreases, and there is no benefit to the client knowing the true value.

Figure 5A:
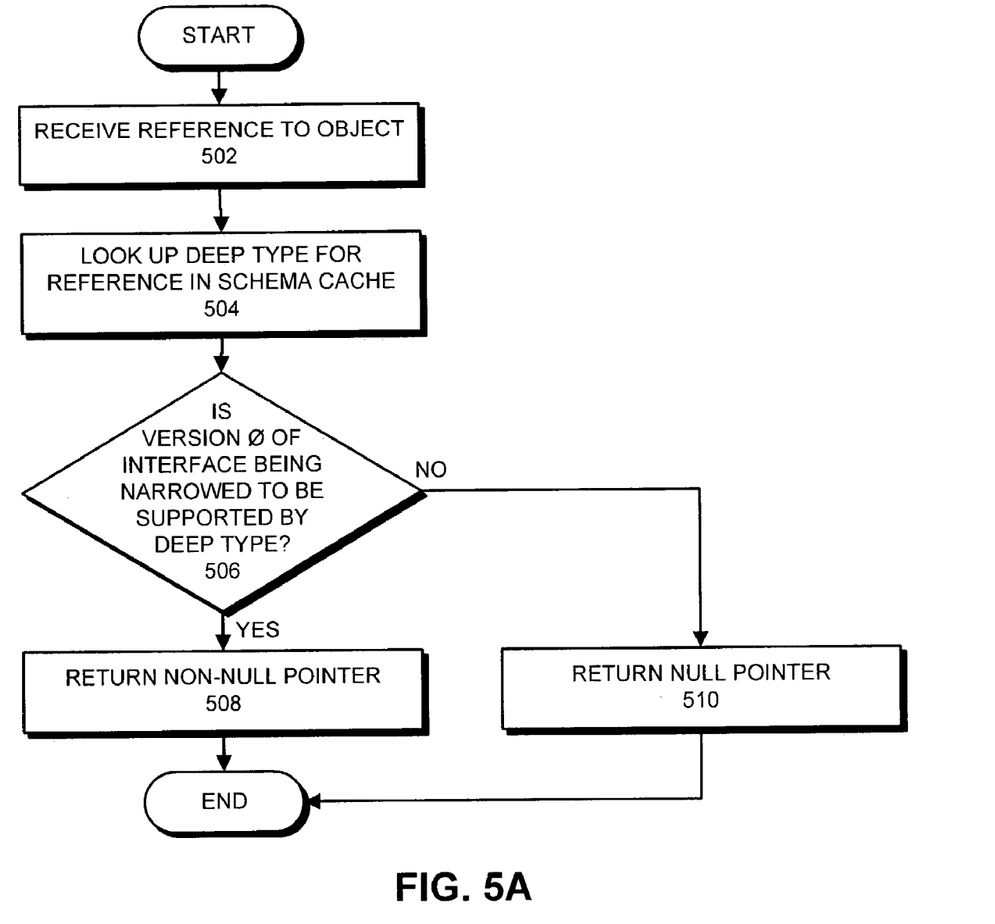
FIG. 5A presents a flow chart illustrating how a reference is narrowed in accordance with an embodiment of the present invention.

FIG. 5A presents a flow chart illustrating how a reference is narrowed in accordance with an embodiment of the present invention. The _narrow function receives an object reference as a parameter (step 502). Next, the system looks up the deep type for the reference in the schema cache (step 504). The system then determines if version zero the interface being narrowed to is supported by the deep type (step 506). If so, the system returns a non-NULL pointer to proxy that supports whatever version of the interface was highest in the IDL file (step 508). Otherwise, the system returns a NULL pointer (step 510).

Figure 5B:
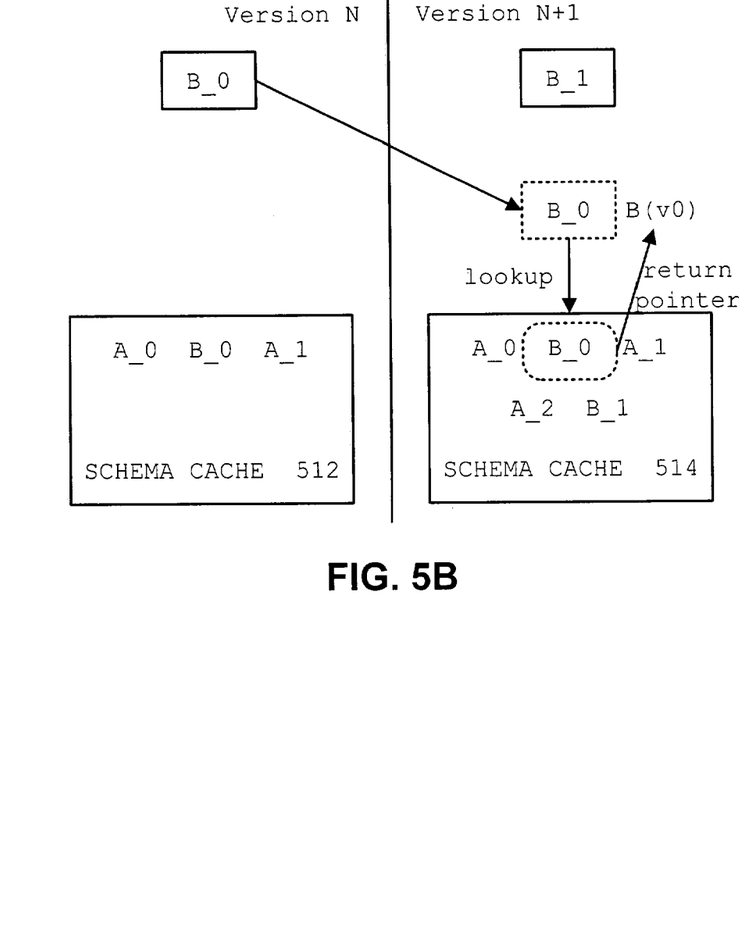
FIG. 5B illustrates how a reference is narrowed between different software versions in accordance with an embodiment of the present invention.

FIG. 5B illustrates how a reference is narrowed to version B_0 in accordance with an embodiment of the present invention. The system starts by receiving a reference to version B_0 of an object. Next, the system looks up a deep type for the object in schema cache 514 (step 504). If version 0 on the interface being narrowed to is supported by the deep type, the system returns a non-NULL pointer to the object (step 508).

Figure 5C:
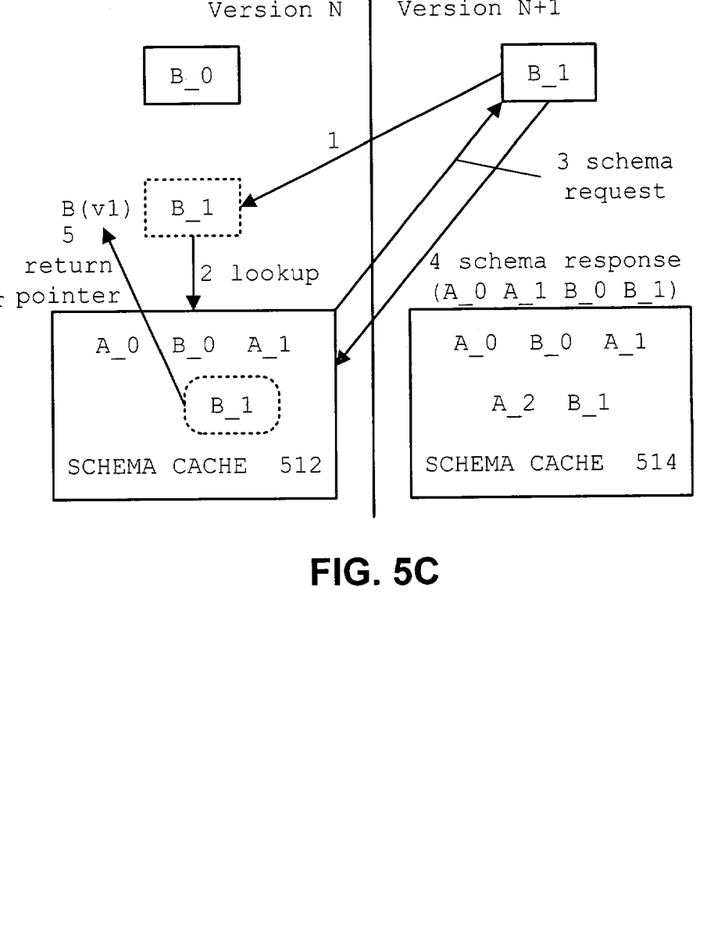
FIG. 5C presents another example of how a reference is narrowed between different software versions in accordance with an embodiment of the present invention.

FIG. 5C illustrates how a reference is narrowed to version B_1 in accordance with an embodiment of the present invention. (1) First, the node running version N+1 sends a reference to an object with deep type B_1 to a node running version N. (2) Next, the node running version N looks up B_1 in its schema cache to determine what other types are supported by that one. (3) The type B_1 is missing from the schema cache, so the remote object is queried to obtain the wire schema (this is a simplification . . . in the full system the remote schema cache would be queried, and it would query the object itself if the entry were missing). (4) The wire schema is returned to the node running version N. It indicates that the interfaces B_1, B_0, A_1, and A_0 are all supported as part of type B_1. (5) Finally, based on the fact that B_0 is in the list of supported interfaces, a pointer of type B (which is really B_0 on this system) is returned.

There is internal knowledge that B_1 is also supported, but that isn't revealed to the application.

Aggregating Interfaces

In preceding sections of this specification, we have examined a minor versioning example, where interfaces were upwardly compatible. Now we will describe a method for aggregating interfaces, which will handle major versioning, and can also be used for more general purposes.

Suppose we need to support two, incompatible interfaces for some function, something like this:

```
interface X {
    void Xi ( );
    void Xii ( );
    void Xiii <1> ( );
}
interface new_X {
    void Xi ( );
    void Xiv ( );
}
```

Also suppose the implementer wants to make a clean break between these two interfaces, and not just add Xiv to version 2 of X. The reason for clean breaks like this is generally because at some future point, the implementer may know that Xii and Xiii will not be subsequently needed, and therefore wants them removed completely (this would be well in the future, when the implementer knows that no client code will ever try to call the obsoleted methods).

Figure 6A:
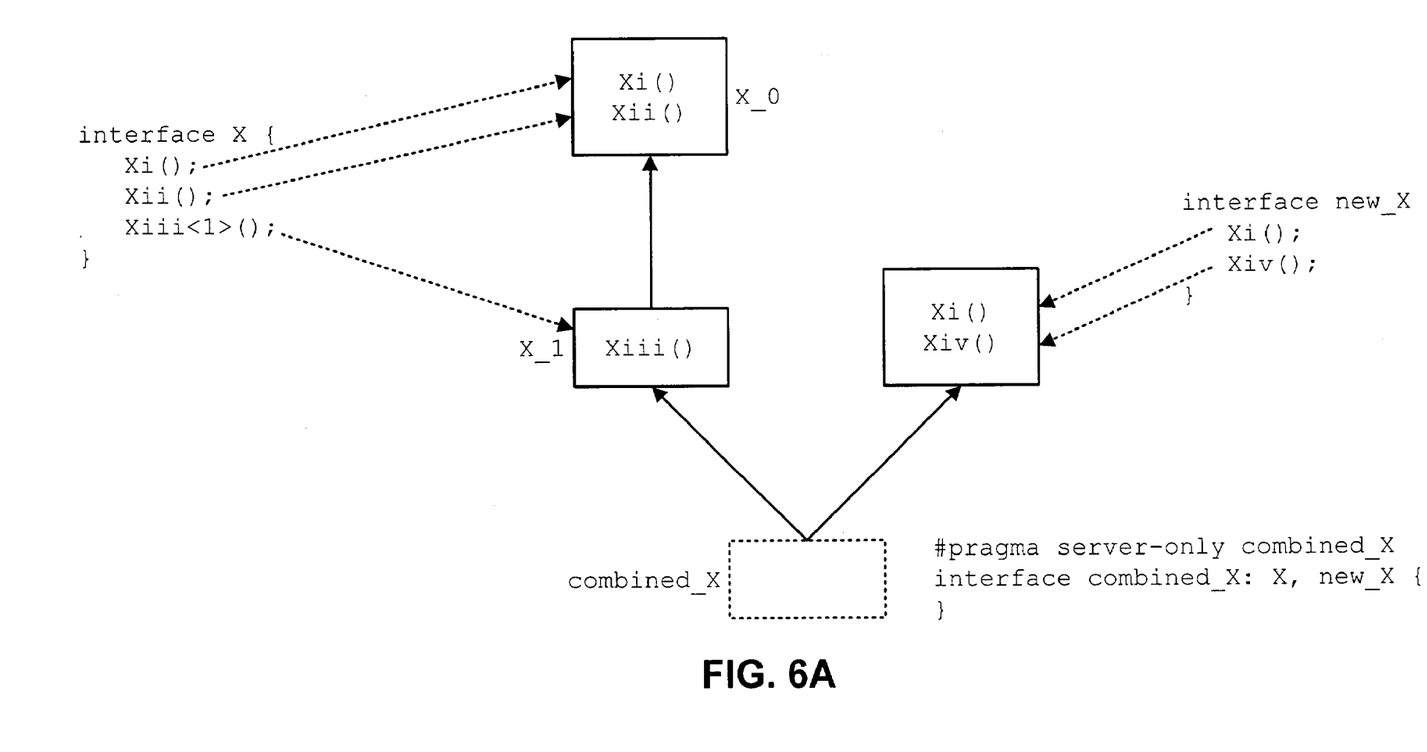
FIG. 6A illustrates a server only interface in accordance with an embodiment of the present invention.

One simple way to join these together would be to create a third object that inherits from both of these interfaces (see FIG. 6A):

Now we have one object that inherits both interfaces that we can use to implement our server. This technique has only one problem. We can't prevent some client from narrowing the object to combined_X, and if any client does that, even if it's only using method Xiv, we can't get rid of Xii or Xiii, and therefore X, because both are inherently part of the type combined_X.

We can solve this problem using a "server only interface," which can be specified using a pragma:

```
#pragma server_only combined_X
interface combined_X : X, new_X {
}
```

A server only interface is just like any other interface, except that these objects can't specify their own methods (doing so will result in a compile time error), and references can't be narrowed to them. A reference to the server implementing the interface combined_X could be narrowed to either X or new_X, but not combined_X. This aids in "enforcement" of the lack of inheritance linkage between the types. In addition, a server only interface cannot be used as a return value, a method argument, in a typedef, union, struct, or sequence type.

By preventing the linkage of the two kinds of interfaces the system allows a single object to implement both, but also allows the elimination of the old interface in the future. In the above example, the combined_X object can be passed to a client that needs to narrow to either X or new_X. The server will have to implement both of these interfaces as long as both types of references exist, but once it knows that X should not be in use by any client (which we are assuming will happen, because the goal is to eliminate the interface) it can just return an exception if old methods are invoked. More importantly, future versions of the product that can establish X will never be used by any clients and can simply create objects that implement new_X instead of combined_X, thereby allowing old_X to be removed entirely. This technique can also be used to clean up the obsolete methods that collect in old interfaces after numerous minor revisions.

Figure 6B:
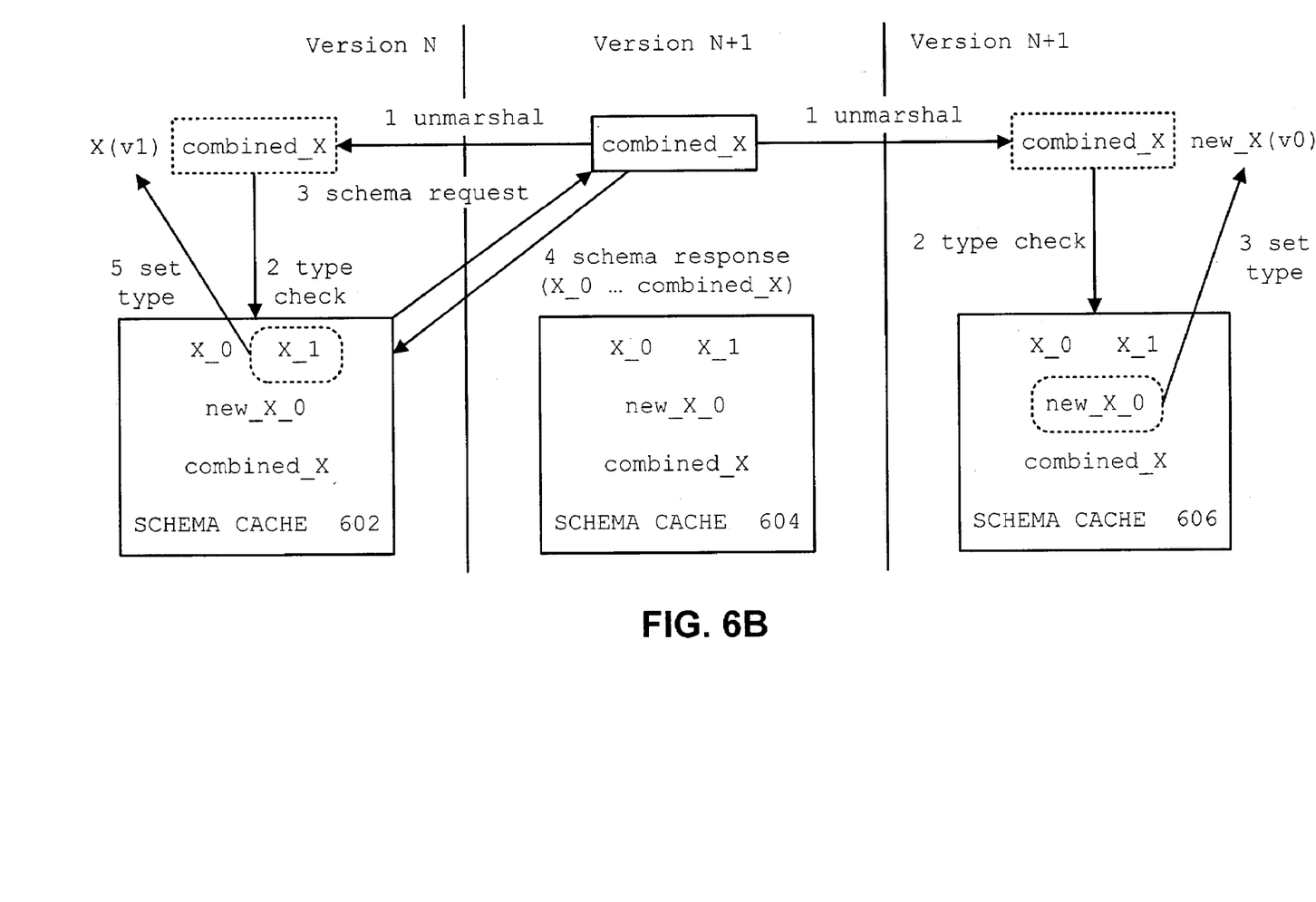
FIG. 6B illustrates how a reference is unmarshalled and narrowed in the context of a server only interface in accordance with an embodiment of the present invention.

FIG. 6B illustrates how a reference is unmarshalled and narrowed in the context of a server only interface in accordance with an embodiment of the present invention. This is just the query for the wire schema (3), and the response to the query (4). A node running version N will not have built-in knowledge of type combined_X, because that type was created in version N+1 of the software. In order to determine what interfaces are supported by an object with deep type combined_X, it must get the list specifically from a node running N+1. In this case, because combined_X supports both X_0 and X_1, narrowing combined_X to X succeeds.

Note that the combination of minor versioning and server only interfaces provides a great deal of flexibility in what interfaces a server can support. Consider our first example before version 1 of A was added to B:

```
interface A {
    void Ai ( );
    void Aii <1> ( );
}
interface B : A {
    void Bi ( );
}
```

Before, we just added version 1 to B by adding an inheritance. We also, of course, had the option of just leaving B as it was, only inheriting A version 0. Now we have an additional option: we could make a server only interface that combines them:

```
#pragma server_only new_A_and_B
interface new_A_and_B : B, A <0:1> {
}
```

A server implementing new_A_and_B will also have to support methods Ai, Aii, and Bi. The difference is that we haven't changed the any aspect or version of B, and therefore the return value of B::_version(ref) will be 0, even though the value of A::_version(ref) will be 1. The combination of minor versioning and server only interfaces can be quite powerful.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting interactions between different versions of software for performing remote object invocations within a distributed computing system, comprising:

receiving a reference to an object at a computer system, wherein the object is implemented on a server;

using the computer system to identify one or more versions of the object supported by the reference, by:
    invoking a method on the object, wherein the method is implemented by a version of the object, and
    if an unsupported version exception is returned by the method, concluding the version of the object supported by the reference is lower than the version of the object that implements the method;

wherein each successive version of the object inherits methods from a preceding version of the object; and using the computer system to invoke a method on the object that is supported by the one or more versions of the object.

2. The method of claim 1, wherein identifying the one or more versions of the object supported by the reference involves calling a version function that returns a highest version of the object supported by the reference.

3. The method of claim 1, wherein the reference operates through an Interface Definition Language (IDL) framework that is supported by an IDL compiler, wherein the IDL compiler compiles interface definitions that specify methods associated with the object.

4. The method of claim 3, further comprising performing a narrow function on the reference, wherein the narrow function succeeds and returns a non-NULL pointer if version number zero of an interface being narrowed to is supported by the reference.

5. The method of claim 3, wherein the IDL compiler supports annotating a method with a version number that identifies a version of an object that implements the method.

6. The method of claim 3, wherein the IDL compiler supports annotating an object with a version number to facilitate specifying inheritance relationships between versions of objects.

7. The method of claim 3, wherein the IDL compiler supports server only interfaces, wherein references cannot be narrowed to a server only interface, and wherein objects cannot specify their own methods;
    wherein the server only interface can be used to create an intermediate object that inherits from two incompatible interfaces to facilitate upgrading to an incompatible major version of software.

8. The method of claim 1, wherein identifying the one or more versions of the object supported by the reference involves examining an object type associated with the reference.

9. The method of claim 8, wherein identifying the one or more versions of the object supported by the reference involves looking up an entry for a deep type associated with the reference in a schema cache, wherein the entry for a deep type in the schema cache specifies versions of the object that are supported by the deep type.

10. The method of claim 9, wherein the schema cache is a multi-level cache that includes:
    a client schema cache located at the client;
    a client-kernel schema cache located within the kernel of operating system hosting the client; and
    a server-kernel schema cache located within the kernel of an operating system hosting die server for the object;
    wherein the lookup is first performed in the client schema cache;
    wherein if the lookup in the client schema cache fails, the lookup is performed in the client-kernel schema cache;
    wherein if the lookup in the server-kernel schema cache fails, the lookup is performed in the server-kernel schema cache;
    wherein if the lookup in the server-kernel schema cache fails, the lookup is performed by asking the server to specify which versions of the object are supported by the reference.

11. A computer-readable storage medium storing instructions that when executed by a computer cause the computer to perform a method for supporting interactions between different versions of software for performing remote object invocations within a distributed computing system, the method comprising:
    receiving a reference to an object, wherein the object is implemented on a server;
    identifying one or more versions of the object supported by the reference, by:
        invoking a method on the object, wherein the method is implemented by a version of the object; and
        if an unsupported version exception is returned by the method, concluding the version of the object supported by the reference is lower than the version of the object that implements the method;
    wherein each successive version of the object inherits methods from a preceding version of the object; and
    invoking a method on the object that is supported by the one or more versions of the object.

12. The computer-readable storage medium of claim 11, wherein identifying the one or more versions of the object supported by the reference involves calling a version function that returns a highest version of the object supported by the reference.

13. The computer-readable storage medium of claim 11, wherein the reference operates through an Interface Definition Language (IDL) framework that is supported by an IDL compiler, wherein the IDL compiler compiles interface definitions that specify methods associated with the object.

14. The computer-readable storage medium of claim 13, wherein the method further comprises performing a narrow function on the reference, wherein the narrow function succeeds and returns a non-NULL pointer if version number zero of an interface being narrowed to is supported by the reference.

15. The computer-readable storage medium of claim 13, wherein the IDL compiler supports annotating a method with a version number that identifies a version of an object that implements the method.

16. The computer-readable storage medium of claim 13, wherein the IDL compiler supports annotating an abject with a version number to facilitate specifying inheritance relationships between versions of objects.

17. The computer-readable storage medium of claim 13, wherein the IDL compiler supports server only interfaces, wherein references cannot be narrowed to a server only interface, and wherein objects cannot specify their own methods;
    wherein the server only interface can be used to create an intermediate object that inherits from two incompatible interfaces to facilitate upgrading to an incompatible major version of software.

18. The computer-readable storage medium of claim 11, wherein identifying the one or more versions of the object supported by the reference involves examining an object type associated with the reference.

19. The computer-readable storage medium of claim 18, wherein identifying the one or more versions of the object supported by the reference involves looking up an entry for a deep type associated with the reference in a schema cache, wherein the entry for a deep type in the schema cache specifies versions of the object that are supported by the deep type.

20. The computer-readable storage medium of claim 19, wherein the schema cache is a multi-level cache that includes:
    a client schema cache located at the client;
    a client-kernel schema cache located within the kernel of operating system hosting the client; and
    a server-kernel schema cache located within the kernel of an operating system hosting the server for the object;
    wherein the lookup is first performed in the client schema cache;
    wherein if the lookup in the client schema cache fails, the lookup is performed in the client-kernel schema cache;
    wherein if the lookup in the server-kernel schema cache fails, the lookup is performed in the server-kernel schema cache;
    wherein if the lookup in the server-kernel schema cache fails, the lookup is performed by asking the server to specify which versions of the object are supported by the reference.

21. An apparatus that supports interactions between different versions of software for performing remote object invocations within a distributed computing system, comprising:
    a computer system:
    a receiving mechanism within the computer system configured to receive a reference to an object, wherein the object is implemented on a server;
    an identification mechanism within the computer system configured to identify one or more versions of the object supported by the reference, by;
        invoking a method on the object, wherein the method is implemented by a version of the object, and
        if an unsupported version exception is returned by the method, concluding the version of the object supported by the reference is lower than the version of the object that implements the method;
    wherein each successive version of the object inherits methods from a preceding version of the object; and
    an invocation mechanism within the computer system configured to invoke a method on the object that is supported by the one or more versions of the object.

22. The apparatus of claim 21, wherein the identification mechanism is configured to invoke a version function that returns a highest version of the object supported by the reference.

23. The apparatus of claim 21, further comprising an Interface Definition Language (IDL) compiler, wherein the reference operates through an IDL framework that is supported by the IDL compiler, wherein the IDL compiler compiles interface definitions that specify methods associated with the object.

24. The apparatus of claim 23, wherein the identification mechanism is configured to provide a narrow function for the reference, wherein the narrow function succeeds and returns a non-NULL pointer if version number zero of an interface being narrowed to is supported by the reference.

25. The apparatus of claim 23, wherein the IDL compiler supports annotating a method with a version number that identifies a version of an object that implements the method.

26. The apparatus of claim 23, wherein the IDL compiler supports annotating an object with a version number to facilitate specifying inheritance relationships between versions of objects.

27. The apparatus of claim 23, wherein the IDL compiler supports server only interfaces, wherein references cannot be narrowed to a server only interface, and wherein objects cannot specify their own methods;
    wherein the server only interface can be used to create an intermediate object that inherits from two incompatible interfaces to facilitate upgrading to an incompatible major version of software.

28. The apparatus of claim 21, wherein the identification mechanism is configured to identify an object type associated with the reference.

29. The apparatus of claim 28, wherein the identification mechanism is configured to look up an entry for a deep type associated with the reference in a schema cache, wherein the entry for a deep type in the schema cache specifies versions of the object that are supported by the deep type.

30. The apparatus of claim 29, wherein the schema cache is a multi-level cache that includes:
    a client schema cache located at the client;
    a client-kernel schema cache located within the kernel of operating system hosting the client; and
    a server-kernel schema cache located within the kernel of an operating system hosting the server for the object;
    wherein the lookup is first performed in the client schema cache;
    wherein if the lookup in the client schema cache fails, the lookup is performed in the client-kernel schema cache;
    wherein if the lookup in the server-kernel schema cache fails, the lookup is performed in the server-kernel schema cache;
    wherein if the lookup in the server-kernel schema cache fails, the lookup is performed by asking the server to specify which versions of the object are supported by the reference.

* * * * *

UNITED STATES PATENT AND TRADEMARK OFFICE
CERTIFICATE OF CORRECTION

PATENT NO. : 7,055,147 B2 Page 1 of 1
APPLICATION NO. : 10/376944
DATED : May 30, 2006
INVENTOR(S) : Skef F. Iterum et al.

It is certified that error appears in the above-identified patent and that said Letters Patent is hereby corrected as shown below:

In Claim 10 (at column 11, line 63), please delete the word, "die" and replace with the word --the--.

In claim 16 (at column 12, line 49), please delete the word, "abject" and replace with the word --object--.

Signed and Sealed this

Fifteenth Day of August, 2006

JON W. DUDAS
*Director of the United States Patent and Trademark Office*